United States Patent [19]

Woody et al.

[11] Patent Number: 4,759,883
[45] Date of Patent: Jul. 26, 1988

[54] TEMPERATURE COMPENSATED FLUID FLOW METERING SYSTEM

[75] Inventors: John C. Woody, Caro; Mark S. Swanson, Cass City, both of Mich.

[73] Assignee: Walbro Corporation, Cass City, Mich.

[21] Appl. No.: 24,987

[22] Filed: Mar. 12, 1987

[51] Int. Cl.[4] .......................... F02M 1/10; F02M 3/10
[52] U.S. Cl. ...................................... 261/39.1; 261/67;
  261/DIG. 84; 261/DIG. 68; 261/DIG. 38; 236/101 C; 236/102
[58] Field of Search .............. 261/DIG. 38, DIG. 68, 261/39.1, DIG. 84, 67; 236/101 C, 102

[56] References Cited

U.S. PATENT DOCUMENTS

| | | | |
|---|---|---|---|
| 1,103,802 | 7/1914 | Meissner | 261/DIG. 38 |
| 1,194,769 | 8/1916 | Neagley | |
| 1,922,266 | 8/1933 | Toman | 236/101 C |
| 1,994,470 | 3/1935 | Grayson | 236/102 |
| 2,126,709 | 8/1938 | Alden | |
| 2,156,128 | 4/1939 | Shaff | 261/DIG. 38 |
| 2,297,231 | 9/1942 | Lichte | |
| 2,367,542 | 1/1945 | Udale | |
| 2,460,647 | 2/1949 | Miller | |
| 2,495,299 | 1/1950 | Tarter | |
| 2,652,105 | 9/1953 | Tjomsland et al. | |
| 2,820,473 | 1/1958 | Reiners | |
| 2,830,621 | 4/1958 | Prescott | 261/39.3 |
| 3,095,175 | 6/1963 | Iketani | |
| 3,378,063 | 4/1968 | Mefferd | 236/93 R |
| 3,454,264 | 7/1969 | Sarto | 261/DIG. 38 |
| 3,484,084 | 12/1969 | Simpson et al. | 261/DIG. 38 |
| 3,696,997 | 10/1972 | Gifford | 236/102 |
| 3,719,322 | 3/1973 | Gifford | 236/102 |
| 3,758,084 | 9/1973 | Tuckey | |
| 3,904,111 | 9/1975 | Petersson | 236/101 R |
| 3,977,600 | 8/1976 | Sheets, Jr. | 236/93 R |
| 4,001,354 | 1/1977 | Tuckey | |
| 4,149,835 | 4/1979 | Wells | 236/93 R |
| 4,184,465 | 1/1980 | Nakazeki et al. | |
| 4,228,956 | 10/1980 | Varner | |
| 4,360,481 | 11/1982 | Kaufman | 261/DIG. 38 |
| 4,579,097 | 4/1986 | Yamaoto et al. | |

FOREIGN PATENT DOCUMENTS 56-115829  11/1981  Japan ........................ 261/DIG. 38

*Primary Examiner*—Tim Miles
*Attorney, Agent, or Firm*—Barnes, Kisselle, Raisch, Choate, Whittemore & Hulbert

[57] ABSTRACT

A temperature compensated carburetor having a fuel metering system including a variable restriction needle gate valve for varying the effective flow cross-sectional area of the main and/or idle fuel supply duct to modulate the flow rate of fuel to the carburetor venturi mixing passage. The needle gate valve is made of plastic material having a much greater coefficient of expansion than the aluminum carburetor body in which it is adjustably mounted such that differential linear expansion and contraction of the needle valve relative to the carburetor body in response to ambient temperature changes varies the flow-controlling cross-sectional area of the fuel duct inversely relative to ambient temperature changes. The needle valve is a rod-like body with a threaded cylindrical mounting portion at one end threadably secured in a threaded bore in the carburetor body. A reduced diameter extension of the needle body extends axially away from the mounting end of the needle body and has cylindrical stem portion slidable in another bore of the carburetor body. The needle body is unrestrained linearly from the free end of the stem portion to the needle body mounting portion. The free end of the stem is movable in a jet fuel feeding passageway of the fuel duct to thus vary the flow controlling cross-section thereof.

16 Claims, 3 Drawing Sheets

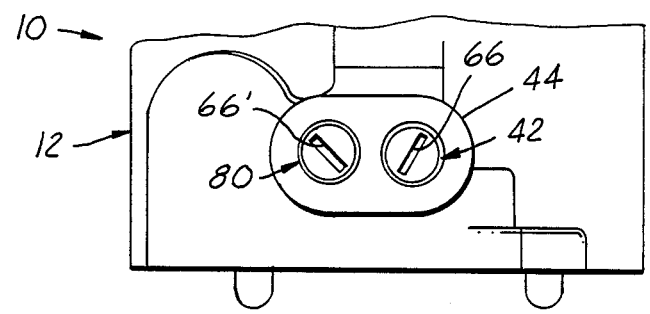
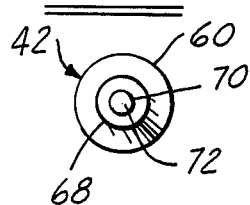
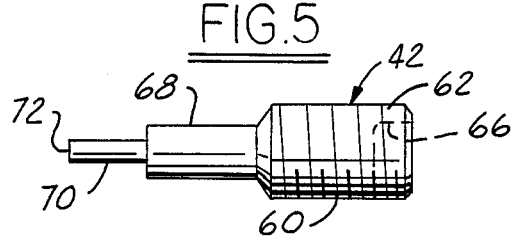
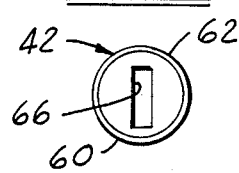
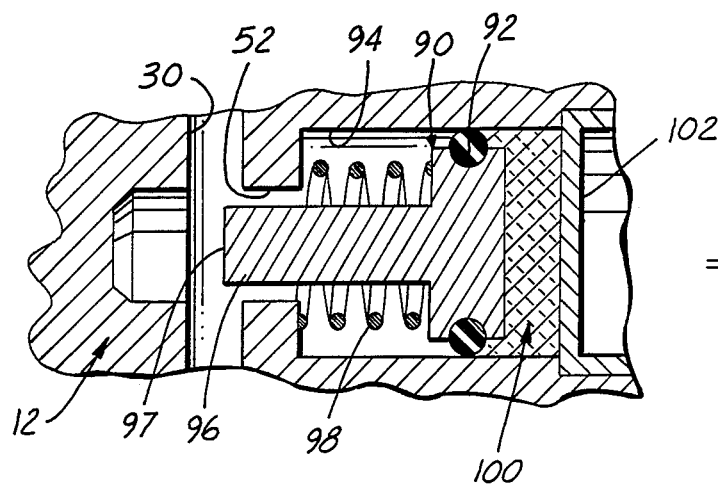
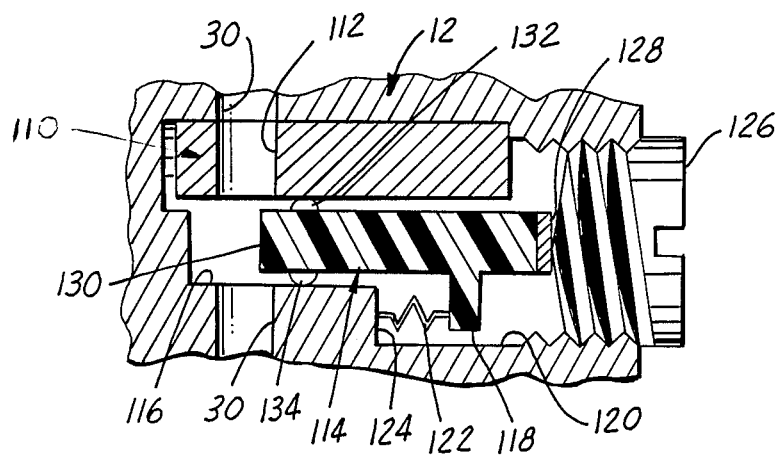

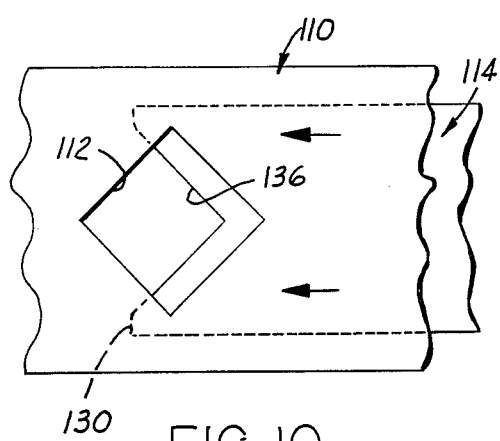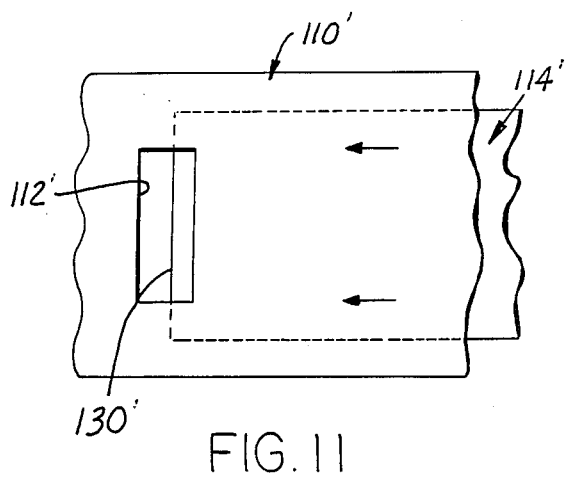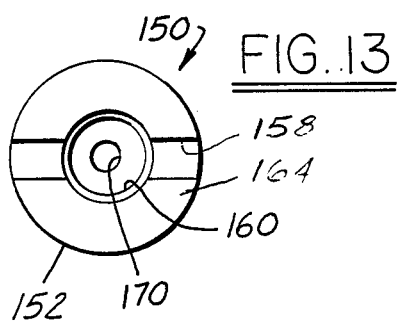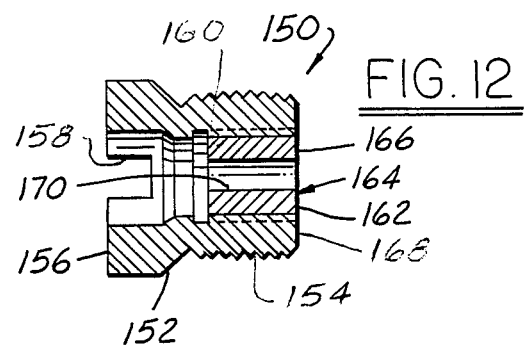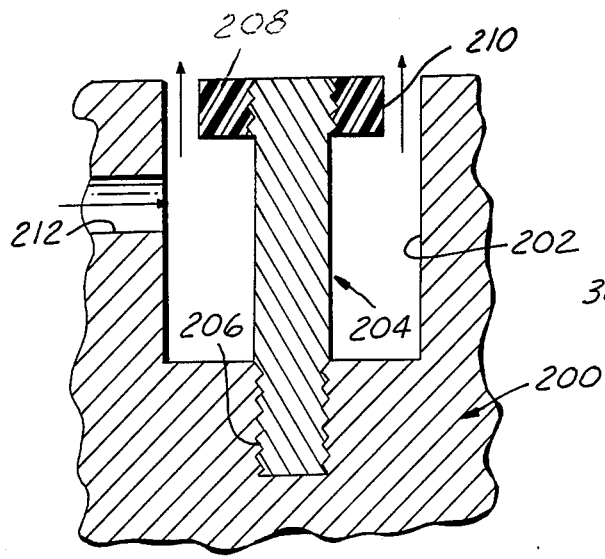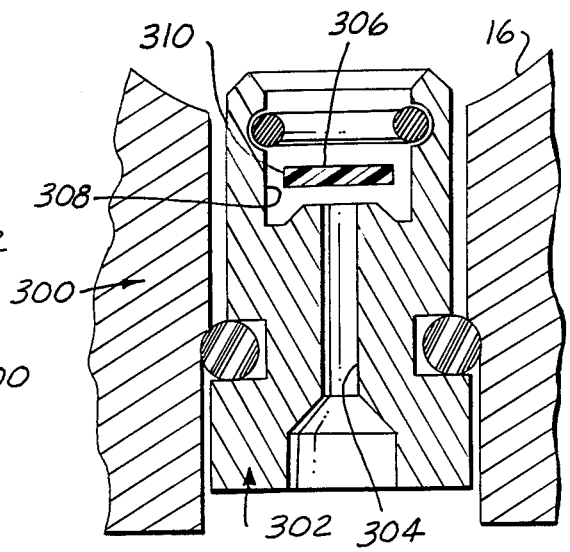

TEMPERATURE COMPENSATED FLUID FLOW METERING SYSTEM

This invention relates to fluid metering systems and devices, and more particularly liquid fuel metering systems for small carburetors that are used in chain saw and other small internal combustion engines.

It has been a problem with carburetors since they were first used to maintain the fuel to air ratio delivered from the carburetor to the engine as constant as possible under wide variations in load and engine RPM when the engines are to be employed in outdoor environments where ambient temperatures may range from −40° C. up to 50° C. Typically with uncompensated prior art small engine carburetors, when the ambient temperatures increases or decreases, the fuel to air ratio changes. This ratio change is due to the change in air density and the change in fuel density and viscosity with temperature change. It can be shown both theoretically and in the laboratory that this fuel to air ratio change is such that with an ambient temperature decrease, the fuel/air ratio becomes lean. The amount lean depends on whether we are examining idle or wide open throttle conditions, and whether the fuel flow through the fuel jet or nozzle (metering orifice) is laminar or turbulent. With increasing ambient temperature, the mixture becomes rich. It would, therefore, be beneficial to have some means for compensating for temperature dependent fuel-air ratio changes in order to better maintain a constant fuel-air ratio regardless of ambient temperature conditions, even under substantially constant altitude operating conditions.

In the field of internal combustion aircraft piston engines much work has been done over at least the last fifty years in developing carburetors and fuel injection systems which will vary the mixture ratio with the speed of the engine and also with altitude. Some examples of such prior art are disclosed in United States Patents to Alden U.S. Pat. No. 2,126,709; Lichte U.S. Pat. No. 2,297,231; Udale U.S. Pat. No. 2,367,542; and Tarter U.S. Pat. No. 2,495,299. However, the complexity and cost of such systems makes them impractical for use in most applications involving small single or two cylinder piston engines developing say less than 10 horsepower.

In present day high cost, sophiscated internal combustion engines, such as provided in automobiles, the aforementioned problem of fuel-air mixture ratio variations has been largely overcome due to the relatively recent developments in electronic fuel injection systems. Typically, such automotive fuel systems employ a solenoid-type electrically controlled and actuated fuel metering valve which is computer operated in accordance with a complex system wherein many parameters of engine operation and ambient conditions are sensed continuously, and these monitored parameters are fed to an electronic processing system to control the fuel metering valve in accordance with the resultant matrix of such parameters. Some examples of such prior art are disclosed in United States Patents to Tugito Nakazeki et al U.S. Pat. No. 4,184,465 and Yamamoto et al U.S. Pat. No. 4,579,097. Again, however, the cost, complexity, bulk and reliability of such fuel injection systems is such to make the same highly impractical for use in the field of small single or dual cylinder engines such as used on chain saws, lawn mowers and other small lawn and garden appliances.

In addition, small carburetors that are used in chain saws and other small engines have been decreasing in size because of the demands for smaller units to fit within small hand-held chain saws. There has also been pressure on the manufacturers of carburetors to reduce the cost of these carburetors because of the keen competition in the field. It is also desirable that servicing of the carburetors be accomplished in as expedient a manner as possible and that the number of parts in the carburetors be reduced. These factors further mitigate against use of such known prior art solutions.

Accordingly, carburetors still remain the only practical choice for gasoline fuel feeding to such small engines wherein the fuel flow to the fuel supply opening in the carburetor throat is controlled by a needle valve. Typically such carburetors are provided with a main adjustment orifice to control fuel supply to the main fuel jet, and an idle adjustment orifice and associated needle valve to control supply of fuel to the idle fuel jets located downstream of the main fuel jet in the vicinity of the throttle valve of the carburetor. In order to overcome the change in fuel/air ratio with ambient temperature changes, it would be beneficial to have a fuel jet (metering orifice) that would become larger in flow cross section as the ambient temperature decreased, and smaller in flow cross section or area as the temperature increased. Unfortunately, this is opposite to the normal co-efficient of linear expansion of metals, plastics, etc.

It is, therefore, an object of the present invention to provide a fuel jet construction for small engine carburetors and the like which is responsive to changes in ambient temperature and operable to reduce or eliminate changes in the fuel-air ratio output of the carburetor induced by ambient temperature changes.

Another object of the present invention is to provide a carburetor fuel jet construction of the aforementioned type which is simple and low cost in construction, rugged and reliable in operation, capable of replacing the conventional idle and high speed fuel adjustment needles, factory adjustable and then sealable against tampering or misadjustment in the field, readily installable in a carburetor, requires a minimum of design changes in the carburetor fuel passages and does not increase the overall dimensions of the carburetor.

A further object of the present invention is to provide a fluid flow metering system constructed and arranged to provide the aforementioned operational characteristics and advantages and yet adaptable as a sub-combination to a variety of analogous applications in related flow controls.

Other objects, advantages and features of the invention will become apparent from the following detailed description, appended claims and accompanying drawings, wherein the principles of the invention are set forth together with the details of construction and operation in connection with the best mode presently contemplated for the practice of the invention.

Drawings accompanying the disclosure and the various views therefor may be briefly described as:

FIG. 4 is a fragmentary end elevational view looking in the direction of the arrow A of FIG. 1.

FIG. 5 is a side elevational view of the high speed needle of the invention shown by itself and enlarged in scale over the showing thereof in FIG. 2.

FIG. 6 is an end elevational view of the high speed needle of FIG. 5.

FIG. 7 is an end elevational view of the end of the high speed needle opposite to that of FIG. 6.

FIG. 8 is a simplified semi-schematic fragmentary center cross-sectional view of a second embodiment of the invention.

FIG. 9 is a simplified semi-schematic fragmentary center cross-sectional view of a third embodiment of the invention.

FIG. 10 is a fragmentary plan view of a portion of the structure of the embodiment of FIG. 9.

FIG. 11 is a fragmentary plan view of a modification of the structure shown in FIG. 10.

FIG. 12 is a center cross-sectional view of a fourth embodiment of the invention.

FIG. 13 is a end elevational view of the embodiment shown in FIG. 12.

FIG. 14 is a simplified semi-schematic fragmentary cross-sectional view of a fifth embodiment of the invention; and FIG. 15 is a simplified semi-schematic fragmentary cross-sectional view of a sixth embodiment of the invention.

DESCRIPTION

Figure 1:
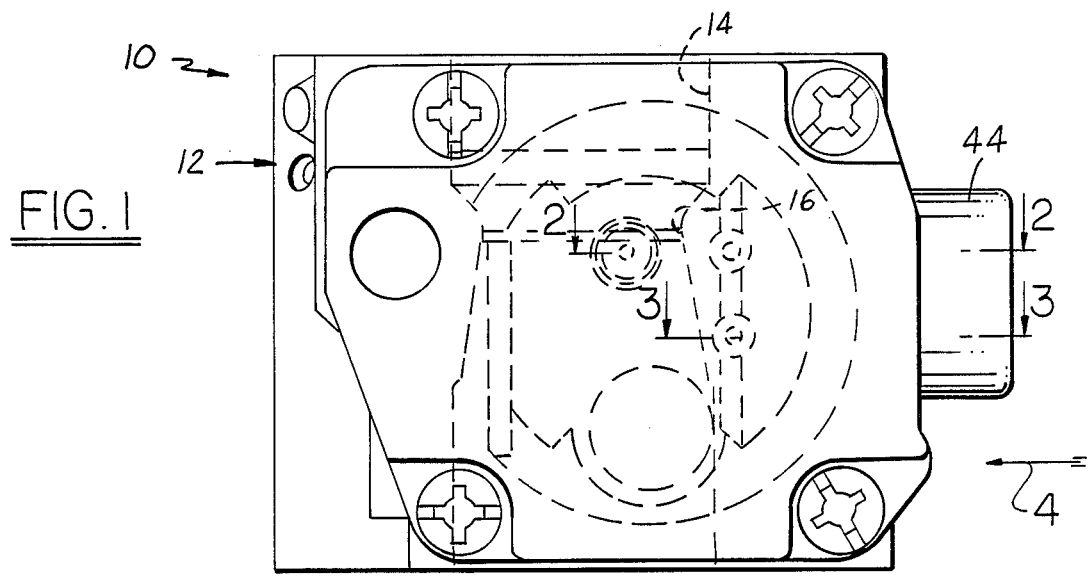
FIG. 1 is a top plan view of a small engine carburetor incorporating an exemplary but preferred embodiment of the present invention.

Referring in more detail to the accompanying drawings, in FIG. 1 a carburetor 10 is shown incorporating the present invention having a die cast and machined aluminum body 12 provided with a mixing passage 14 extending through body 12 and open at the opposite ends thereof. Mixing passage 14 includes the usual venturi section 16 which may be provided with the usual throttle and choke valve plates (not shown).

Figure 2:
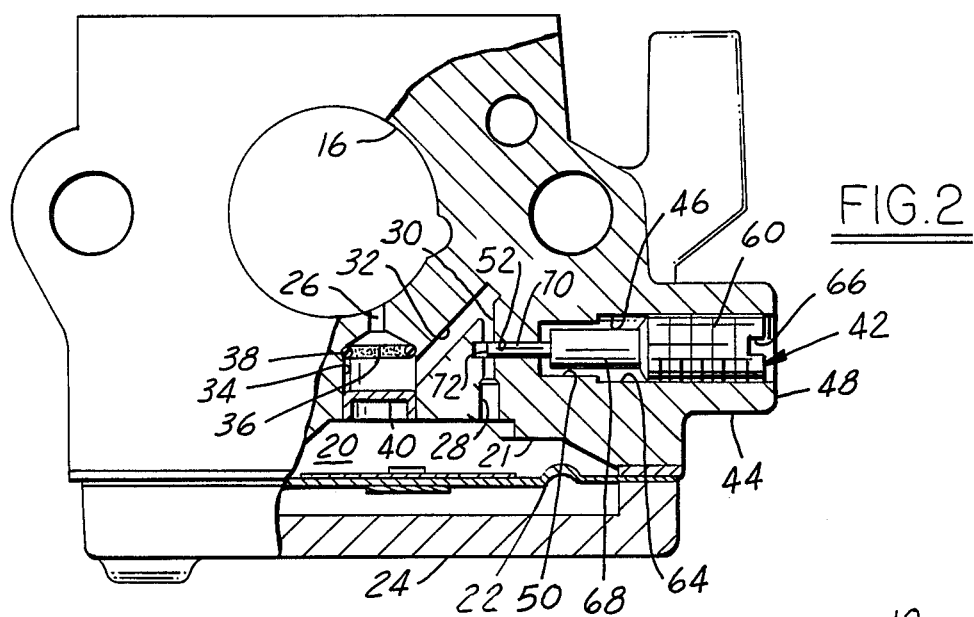
FIG. 2 is a vertical cross sectional view taken on the line 2—2 of FIG. 1.

Referring to FIG. 2 a diaphragm chamber 20 at one surface of the carburetor body. i.e., bottom surface as shown in FIG. 2, is formed by the body face 21 of body 12 and a diaphragm 22 held in place by a cover plate 24. In accordance with conventional practice, diaphragm 22 controls a springed biased lever (not shown) which in turn controls an inlet valve (not shown) for admitting fuel to chamber 20.

Carburetor 10 may be of the type shown in U.S. Patent to Charles H. Tuckey, U.S. Pat. No. 3,758,084, issued Sept. 11, 1973, as well as U.S. Pat. No. 4,001,354, issued Jan. 4, 1977, both assigned to the assignee of the present application, the same being modified in accordance with the principles and details of the present invention as described hereinafter, and the same being incorporated herein by reference. Thus, liquid fuel (gasoline) is fed from a fuel tank (not shown), usually engine or appliance mounted, to the diaphragm chamber 20 from a pumping system (not shown), which may be a built-in diaphragm-type as shown in the aforementioned patents or from a separate fuel pump. Such fuel is then fed from diaphragm chamber 20 to a main nozzle outlet 26 in venturi 16 via an interconnected series of communicating passages 28, 30, 32, and 34. Passage 34 is provided with the usual anti-back bleed screen 36 held by a retainer ring 38, and the bottom of passage 34 opening to chamber 20 is closed by a press fit cap 40.

In accordance with one principle feature of the present invention, fuel flow between diaphragm chamber 20 and main nozzle 26 is controlled by a high speed needle of the invention, which as shown is in the form of a temperature compensating gate valve 42, the same being shown installed in body 12 is provided in FIGS. 2 and 4 and by itself in FIGS. 5, 6 and 7. Body 12 is provided with an integral boss 44 which is drilled and tapped to provide a series of coaxial cylindrical bores of progressively reduced diameter, comprising a threaded bore 46 open at its outer end at the exterior face 48 of boss 44, and opening its other end to a slightly reduced diameter counterbore 50. Counterbore 50 in turn opens to a relatively narrow diameter bore 52 which extends across fuel passage bore 30 such that the axes of these diameter intersect perpendicularly. In one working example the diameter of bore 30 is 0.026 inches and the diameter of bore 52 is 0.040 inches.

Needle 42 has a main body portion 60 (FIGS. 2 and 5–7) which is provided with external threads 62 which are adapted to threadably engage internal threads 64 provided in bore 46. A screw driver slot 66 is provided at the outer end of needle 42 to facilitate screwing needle 42 into boss 44 and for operational adjustment of the same. Needle 42 has a reduced diameter shank 68 which extends from body portion 60 into counter bore 50 with a relatively large clearance therebetween. Shank 68 terminates at its inner end in a cylindrical stem 70 which slides with a close fit in bore 52. Preferably, the end face 72 of stem 70 is positioned by threaded adjustment of needle 42 so as to be disposed flush with the central axis of bore 30 at a standard ambient adjustment temperature, which for example, and convenience, may be room temperature, such as 20° C.

Figure 3:
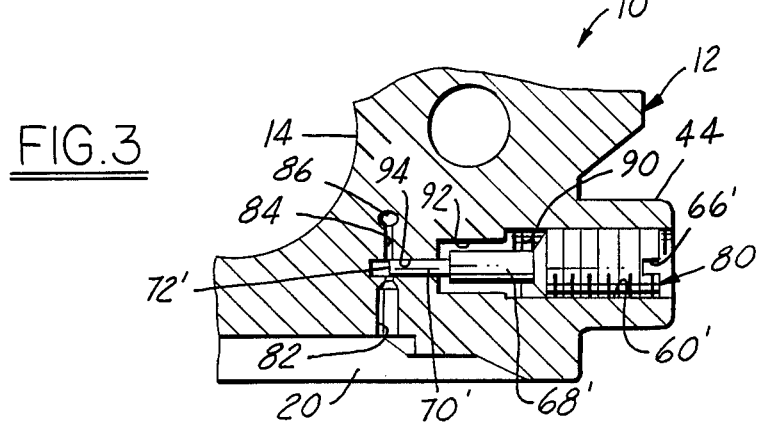
FIG. 3 is a vertical cross sectional view taken on the lines 3—3 of FIG. 1.

In accordance with a further feature of the present invention, carburetor 10 is also provided with a low speed needle which as shown is in the form of temperature compensating fuel regulating needle gate valve 80 shown installed in FIGS. 3 and 4 to control fuel flow from chamber 20 to the idle nozzle outlets of the carburetor (not shown) via interconnected fuel passages 82, 84 and 86. Needle 80 is also mounted in boss 44 adjacent needle 42 and preferably is identical in construction to needle 42, except for the length between face 72' and body portion 60', i.e. the combined length of shank 68' and stem 70', versus the length of the corresponding portions of needle 42. This "free length" difference is provided to accommodate the smaller diameter of idle passage 84 as compared to main passage 30 while still maintaining the same percentage change in the flow controlling cross section of the respective passages. Needle 80 is threadably inserted into the exterior open end of a threaded bore 90 which connects at its inner end to a slightly reduced diameter counterbore 92, which in turn connects to a small diameter bore 94 which crosses fuel passage bore 84, the axes of these bores also intersecting perpendicuarly. The stem 70' of needle 80 has a close sliding fit in bore 94 and its end face 72' is disposed flush with, or close to, the axis of bore 84 at the aforementioned standard adjustment temperature.

In accordance with yet another feature of the present invention, needles 42 and 80 are threadably adjusted by using a screw driver or the like such that the associated stems 70 and 70' variably protrude into passages 30 and 84 respectively to function as fuel-flow-controlling gate valves in these passages. In this respect, needles 42 and 80 are operated in much the same manner as conventional carburetor needle valves, and hence their installation and adjustment procedure, as well as their position in the carburator, will be readily understood by engine operators and service personnel familiar with prior art small engine carburetors.

However, in accordance with still another feature of the present invention, needles 42 and 80 are made in one piece from a selected plastic material having a co-efficient of linear expansion several orders of magnitude greater than that of the metal, usually aluminum or an aluminum alloy, from which body 12 in the carburetor is constructed. Thus, in one working example, body 12 is constructed of an aluminum alloy having a co-efficient of expansion $22.39 \times 10^{-6}$ inch/inch/°C., and needles 42 and 80 were injection molded and machined from Delrin brand acetyl plastic having a co-efficient of expansion of $100 \times 10^{31\ 6}$ inch/inch/°C. The length of stem 70, 70' and shank 68, 68' is designed so as to produce a predetermined finite range of movement of face 72, 72' in passages 30, 84 through the usual or expected range of ambient operating temperatures, usually $-40°$ to $+50°$ C. The diameters of bores 30 and 84 are selected to match the fuel flow requirements of the carburetor application. Thus, in the aforementioned working example, the diameter of idle passage 84 was 0.0156" as compared to the aforementioned diameter of main fuel control passage 30, but the diameter of passage 94 is again 0.040 inches.

At the standard set up temperature the high and low speed needles 42 and 80 are rotatably threadably adjusted to provide the proper air-fuel ratio during various engine operating conditions at the standard ambient set up temperature. Faces 72 and 72' are thus suitably positioned in passages 30 and 84 respectively such that stems 70 and 70' provide the proper amount of obstruction to fuel flow therethrough in much the same manner as initial set-up engine tuning adjustment is accomplished with conventional prior art needle valves. However, once carburetor 10 is thus adjusted, a hardenable sealant material, such as epoxy adhesive, is placed in the screw driver slots 66 and 66' as well as across the outer end faces of needles 42 and 80 to prevent further screw driver adjustment of the same.

In operation of the carburetor 10, the temperature of needles 42 and 80 will generally closely track with, or be substantially the same as the temperature of the liquid fuel filling chamber 20 and flowing through the main and idle passages to the main and idle fuel nozzles of carburetor 10. The fuel temperature in turn will be primarily determined by the fuel tank temperature which, in most instances, will be essentially at or representative of outdoor ambient air temperature. Since the needles 42 and 80 have approximately five times the expansion co-efficient of the aluminum material of body 12, and since the needles are locked in place along their threaded end portions 60 and 60' by the threaded engagement thereof with bores 46 and 90, differential expansion and contraction will occur between the needle Delrin plastic material and the carburetor body aluminum material, resulting in elongation and contraction linearly or axially of shanks 68, 68' and stems 70 and 70' relative to their associated mounting bores in body 12. Thus, the positions of end faces 72 and 72' in passages 30 and 84 respectively will vary as a function as the temperature of the needles 42 and 80, which in turn is a direct function of the temperature of the fuel being fed to the carburetor mixing passage 14, and thus as an indirect function of outdoor ambient temperature.

Thus, as outdoor ambient air temperature drops and the air flowing through the carburetor becomes denser, and likewise fuel density and viscosity increase, the resulting contraction of needles 42 and 80 will move stem faces 72 and 72' to the right as viewed in FIGS. 2 and 3, reducing the obstruction of the gate valve stems 70 and 70' to fuel flow through passages 30 and 84 respectively. Hence, the fuel flow rate in the passage tends to increase to match the increase in air density to maintain a constant fuel-to-air mass ratio even though the fuel becomes denser and more viscous. On the other hand, an increase in temperature of the needles over their standard ambient set-up temperature will cause the lineal expansion of shanks 68, 68' and stems 70 and 70' relative to their mounting bores in body 12, moving end faces 72 and 72' to the left as viewed in FIGS. 2 and 3, thereby increasing the obstruction of the gate valve stems 70 and 70' to fuel flow in passage 30 and 84 respectively. Again this tends to maintain a constant fuel-to-air mass ratio in the output of carburetor 10 despite the fuel becoming less dense and lower in viscosity, and the ambient air also becoming less dense.

It thus will now be understood that the parameters determining fuel flow rate and the desired fuel-air ratio of the carburetor output can be determined in accordance with known engineering principles and practice and co-related with the amount of movement of the stems 70 and 70' as required to modulate fuel flow throughout the range of temperature conditions expected. Preferably, the obstruction to fuel flow is normally varied only enough to vary the effective flow-controlling cross-sectional area of fuel passages 30 and 84 by about 1% per 10° C. temperature change, i.e., about a total of 6% in a temperature range of $-20°$ C. to $+40°$ C., in direct response to temperature modulated movement of the gate valve stems 70 and 70'.

However, the designer has available a selection of materials and dimensional relationships with respect to the needles and flow passage controlled thereby which can be tailored to effect greater or less fuel flow rate modulation as may be required to satisfy the expected operating environment for a given carburetor.

It is also to be understood that the clearance between the stems 70 and 70' and their respective bores 52 and 94 is established to provide a sliding clearance even at the maximum operating temperature. Hence at coldest operating conditions, there is a leakage clearance between these stems and their bores 52 and 94. Nevertheless, the chambers defined by bores 50 and 46 surrounding shank 68, and by bores 92 and 90 surrounding shank 68', are respectively closed by the threaded engagement of body portions 60 and 60' of the needles, as well as by the sealant installed after initial set up as described above, and hence such leakage does not effect the operation of the carburetor.

The dimensions and materials of the specific working embodiment disclosed herein, in addition to those specified previously hereinabove, and including the actual travel distance of the control faces 72 and 72' in the associated fuel ducts, and the range of temperature of needles 42 and 80, is as follows:

60 and 60': 0.300 inches
68: 0.250 inches
68': 0.170 inches
70 and 70': 0.150 inches
Relative Movement of Face 72 versus Bore 30 from $-40°$ C. to 50° C. (90° C. range): 0.00280 inches
Relative movement of face 72' in bore 84 from $-40°$ C. to 50° C. (90° C. range): 0.002245 inches
Total flow area ratio change over 90° C. range: 9.08%

Change in flow area per 10° C. temperature change: 1.01%

It is to be further understood that bore 52 may intersect bore 30 at an angle other than a right angle, and the same is true with respect to the angle of intersection of bore 94 with bore 84. Moreover, the respective axes of these intersecting bores may, if desired, be offset from one another to a slight extent rather than being coincident as set forth in the foregoing preferred example of FIGS. 1 through 7.

Moreover, the shanks 68 and 68' of needles 42 and 80 may be manufactured to the same diameter as the associated stems 70 and 70' of these needles, since the diameter of the needle material is not a factor in the linear or axial expansion and contraction of the same with temperature changes. Hence, diameter is chosen as a function of manufacturing economy factors as well as strength and size considerations. Moreover, if a different relationship is desired between the percentage change in flow controlling area between the idle and main fuel passages, this can be readily accomplished merely by varying the length dimension of the stem-shank portions 70-68 and 70'-68' of needles 42 and 80 respectively.

Other variations encompassed by the present invention are illustrated in FIGS. 8, 9, 10 and 11. Referring to FIG. 8, a modified form of fuel metering valve is shown embodied in the body 12 for controlling the flow cross sectional area of passage 30. In this embodiment a gate-type valve 90 having a piston head 92 slidable in a bore 94 is substituted for needle 42 of the previous embodiment. Valve 90 has a stem 96 corresponding to stem 70 slidable with a relatively close fit in bore 52. A compression coil spring 98 abuts at one end against the blind end of bore 94 and at the opposite end against piston 92 to bias valve 90 to the right as viewed in FIG. 8. A body of suitable material having a relatively high coefficient of expansion, such as silicone, is provided in a form of a cylindrical slug 100 which abuts at its inner end against piston 92 and is captured at its outer end by a suitable end plug 102 suitably affixed to body 12. In this embodiment, the greater increment of linear expansion in the direction of the axis of stem 96 resulting from expansion of slug 100 for a given increment of temperature change enables the overall axial length of the valve 90 and slug 100 to be considerably foreshortened relative to needle 42 to produce the same change in flow controlling cross-sectional area via movement of the end face 97 of stem 96 in passage 30 as compared to needle 42. When slug 100 contracts with reduction in temperature, spring 98 insures retractile movement of valve 90 (to the right) to a corresponding extent. The fuel metering compensating construction of the embodiment of FIG. 8 is thus advantageous in situations requiring overall axial compactness.

Referring to the further modified embodiment illustrated schematically in FIG. 9, a temperature compensating fluid flow metering construction also in accordance with the present invention is shown fragmentarily and somewhat schematically in the form of a slide valve construction. In this embodiment, the fuel flow passage 30 is bisected by a control orifice plate 110 affixed to body 12 and having a flow passage 112 aligned with bore 30. The flow controlling cross sectional area of passage 112 is modified in accordance with temperature changes by a slide valve 114 of generally planar shape adapted to lie against the underside of plate 110. A suitable cavity 116 is provided in body 12 to receive valve 114 for movement therein. Valve 114 has a downward protrusion 118 disposed in an offset cavity 120 in body 12, and a compression coil spring 122 abuts at its opposite ends respectively against a shoulder 124 of cavity 120 and protrusion 118 to bias valve 114 to the right as viewed in FIG. 9. A set screw 126 is threaded into body 112 to abut the end 128 of valve body 114 for adjustably positioning valve 114 in cavity 116. The free end face 130 of valve 114 is adapted to move in the plane of the drawing in response to temperature changes of the fuel flowing in bore 30 in the manner of end face 72 of needle 42. If desired, sealing ribs 132 and 134 may be provided across the opposite flat faces of valve body 114 to limit or prevent liquid seepage into cavity 120. Valve body 114 may be constructed of the aforementioned Delrin acetyl plastic material to provide a differential coefficient of expansion relative to the aluminum material of body 12.

As best seen in FIG. 10, which is a fragmentary view of valve plate 110 and the associated valve body 114 in plan view, passage 112 of the valve plate may have a square configuration with two opposed corners aligned with the direction of movement of valve body 114 and the other two opposed corners arranged perpendicular to this direction of motion. The end face 130 of valve body 114 in the region thereof registering with opening 112 may have a V-shaped notch 136 adapted for limited movement within the projected area of opening 112 to partially obstruct the same to a varying degree depending upon the temperature of the fuel in bore 30. The effective flow controlling cross-sectional area of passage 112 thus will retain a square configuration that will vary in size depending on the position of end face 130 and the associated notch 136 relative to opening 112.

FIG. 11 illustrates a further modification of the embodiment of FIGS. 9 and 10 wherein corresponding elements are given the same reference numerals raised by a prime suffix. In this embodiment the valve plate 110' is provided with a rectangular passage 112' having its relatively narrow width dimension aligned with the direction of travel of the end face 130' of valve body 114'. The free end face 130' of valve body 114' has a straight line configuration perpendicular to its direction of travel. The width of opening 112' is correlated with the range of motion of face 130' so as to slightly exceed the same. With this configuration, the rate of change of the flow controlling cross-sectional area of 112' is maximized relative to the incremental changes in length of valve body 114' with fuel temperature changes.

It will thus be understood that from the embodiments of FIGS. 9-11 that other shapes may be employed for openings 112 and 112', as well as for the associated cooperative end faces 130 and 130', such as curved edges converging at a closed end and diverging at an open end. The particular geometry of such cooperative flow controlling-opening defining faces may thus be selected as may be desired for a given application to provide a non-linear change in the flow controlling cross section as a function of the linear incremental change in the length of the valve body 114 or 114'.

Still further variations of the principles of the present invention are illustrated in the further modified embodiments of the invention illustrated in FIGS. 12 through 15. Referring to FIGS. 12 and 13, the same respectively illustrate in central cross section and left end views a temperature compensating fuel metering jet or nozzle adapted for use in an otherwise conventional carburetor construction, as will be well understood in the art. Jet 150 comprises a metal body 152 having an externally threaded portion 154 and an enlarged portion 156 provided with a screw driver cross slot 158 for adjustably threading body 152 into an associated tapped bore in a carburetor body (not shown), such bore being part of the main or idle fuel flow passage in the carburetor body. Thus, such a passage may, for example, correspond to passage bore 34 in carburetor 10 in which jet 150 has been substituted for the cap plug 40 to provide fuel flow communication between diaphragm chamber 20 and main nozzle 26.

Body 152 has a stepped through bore 160 the outlet of which is provided with internal threads 162. A jet or nozzle sleeve 164 is firmly captured within bore 160 by being molded in place in the threaded portion of bore 160 so as to have its outer face 166 flush with the end face 168 of body 152. Sleeve 164 has a cylindrical central passage 170 extending coaxially therethrough. Preferably body 152 is made of S.A.E. C.A.-360 H.H. Brass as a screw machine part, and sleeve 164 is molded in-situ onto threads 162 from a suitable plastic material such as Minlon 12 T. Thus, the coefficient of expansion of sleeve 164 greatly exceeds that of body 152. As fuel temperature increases passing through jet 150, the differential coefficient of expansion between sleeve 164 and body 152 will cause the diameter of through passage 170 to decrease and thus cause a corresponding reduction in the flow controlling cross section of passage 170, and vice-versa with decreases in fuel temperature.

Referring to the modified embodiment of FIG. 14, an aluminum body 200, which may correspond to the carburetor body 12, is provided with a cylindrical blind bore 202 which forms part of a fluid flow passageway network. A metal stud 204, which is threaded at opposite ends, is screwed at one end into a tapped counter bore 206 so as to extend co-axially within bore 202. A plastic circular disc 208 is threaded or molded in-situ onto the upper end of stud 204 so as to extend across the upper circular outlet end of bore 202. The clearance between the outer periphery 210 of disc 208 and the cylindrical wall of bore 202 is chosen to control fuel flow through this clearance in the direction of the arrows in FIG. 14. Fuel is admitted to bore 202 by a suitable fuel feeding passage 212. Due to the differential coefficient expansion between disc 208 and surrounding aluminum material of body 200 the flow controlling cross section of the annular passage defined between disc 208 and bore 202 will vary inversely with the controlled fluid temperature changes as in the previous embodiments to provide a temperature compensating fluid flow controlling metering passage system.

Referring to the embodiment of FIG. 15, a carburetor body 300 having a venturi passage 16 is provided with the usual brass main fuel jet nozzle body 302 having a liquid fuel metering through-passage 304. A back check valve disc 306 is provided in a cylindrical outlet cavity 308 to permit fuel flow past the outer periphery of disc 308 in an upward direction as viewed in FIG. 15 into venturi passage 16, but operates as a back check valve to prevent back bleed upon a pressure reversal, this much being in accordance with conventional practice as will be well understood by those skilled in the art. However, in accordance with the present invention, disc 306 is made of a selected plastic material having a substantially higher coefficient of expansion than the metal material of body 302, usually brass, or aluminum. Hence disc 306 will increase in diameter with temperature increases in the liquid fuel flowing thereby, and vice-versa. Again, the diameter of the outer periphery 310 of disc 306 is correlated with the inside diameter of the cylindrical wall of cavity 318 to provide a predetermined flow controlling cross section therebetween. Hence, jet nozzle 302 may perform the triple functions of (1) controlling liquid fuel flow due in accordance with the diameter chosen for passage 304 relative to the operable fuel feeding pressure differentials of the carburetor-engine system (2) operating as a check valve to prevent air back bleed and (3) modulating the fuel feed with temperature changes in accordance with the principles of the invention as described previously.

It is also to be understood that the principles of the present invention can be applied to existing carburetor needle valve constructions of the usual type having a finely pointed conical tip adjustable in a complimentarily configured conical fuel feeding passageway, in either the idle or the main fuel flow system of the carburetor. By constructing the needle valve of a suitable plastic material the same as or similar to that employed in needle 42 as described previously, the fuel controlling tip of the needle will be free to move in the surrounding passageway with fuel temperature changes in much the same manner as stem 70 of needle 42 described previously, it being understood that the carburetor body is made of an aluminum material having a much lower coefficient of expansion than the plastic material of the needle valve.

However, it is to be noted that the liquid flow through the flow controlling cross section of a needle valve arrangement is laminar, whereas in the preferred embodiments of FIGS. 1–7, as well as in the variations thereof shown in FIGS. 8–11 and 12–13, the valve construction is such as to create turbulant flow at the valve stems 70, 70' and 96 and valve plates 114 and 114'. Turbulant flow at discs 208 and 306 of the embodiments of FIGS. 14 and 15 respectively can also be produced by suitably dimensioning the disc, i.e., making the same very thin axially as compared to their diameter and/or reverse tapering (beveling) the outer peripheral surface of the disc. It has been found that, in accordance with the present invention, a temperature compensating fuel metering valve preferably should be constructed such as to create turbulant flow rather than laminar flow because much less differential movement between the valve and its associated body passageway is required in order to achieve the same degree of temperature compensation. With laminar flow arrangements the mass fuel flow rate is greatly dependent upon changes in fuel viscosity as well as in density with temperature, thereby requiring a much greater change in flow controlling cross-sectional area to achieve the same change in mass flow rate as compared to a compensating valve constructions wherein turbulent flow is produced past the flow controlling cross section zone. In other words, with turbulent flow constructions the effect of temperature-induced viscosity changes is essentially nullified so that only temperature-induced changes in fuel density need be considered in designing the variation in size of the flow controlling cross section of the passageway. Thus, the turbulant fuel flow metering embodiments of the invention are preferred from the standpoint of reduction in overall size and cost and for greater simplicity and reliability.

From the foregoing description, it will now be apparent that the present invention provides many advantages over the prior art. The fuel metering construction of the present invention is particularly suited for small engine carburetors and the like, and is responsive to changes in ambient temperature to reduce or eliminate changes in the fuel-air ratio output of the carburetor induced by such ambient temperature changes. The carburetor fuel metering construction of the invention is simple and low cost in construction, rugged and reliable in operation, capable of replacing the conventional idle and high speed fuel adjustment needles, factory adjustable and then sealable against tampering or misadjustment in the field, readily installable in a carburetor, requires a minimum of design changes in the carburetor fuel passages and does not increase the overall dimensions of the carburetor.

Moreover, a carburetor provided with a temperature compensating fluid flow metering system of the present invention need not be mounted on the engine in a location where the carburetor is in a hot air stream downstream of the engine cooling fins, which is a location hitherto often chosen in order to compensate for low ambient temperatures. The engine designer thus has greater latitude in engine design in this respect. Additionally, a carburetor equipped with the present invention eliminates the prior need to mount the fuel tank in a location relative to the engine so as to enhance conduction heating of the fuel tank in order to compensate for low ambient temperatures. Instead, the engine designer can mount these engine parts in the coolest available locations to better protect the same against adverse effects of extreme high ambient temperatures. Likewise, when the engine is equipped with a carburetor provided with the temperature compensation system of the invention, many of the other prior art devices and systems presently employed to heat the fuel and/or engine intake air may be eliminated.

Thus, it will be appreciated that the preferred embodiments of the fuel metering devices for internal combustion engines described and illustrated herein amply fulfills the aforementioned objects of the invention. However, it will be realized that further variations of the inventive concept will occur from the foregoing disclosure to those skilled in the art. For example, the invention is applicable to float carburetors as well as diaphragm carburetors. It will also be understood that in some applications a pair of needles 42 may be employed with the same mounted in coaxial alignment with their flow-controlling faces 72 juxtaposed in a mutual facing relationship in duct 30. With such an arrangement, the differential movement of the pair of end faces toward and away from one another will double the variation in flow controlling cross-sectional area for a given temperature change increment. Alternatively, with such a juxtaposed tandem arrangement, the length of each of the needles in their free floating portions 68, 70 may be half that of needle 42 to produce the same effective flow controlling relationship relative to passage 30. Therefore, the invention should not be considered limited to the preferred embodiment described above and shown in the drawing, but can be modified in various ways within the scope of the appended claims and applicable prior art.

We claim:

1. In a carburetor having a mixing passage, a fuel supply chamber, fuel duct means to conduct fuel from the chamber to the mixing passage, and a fuel metering system associated with said fuel duct means including variable restriction means for varying the effective flow cross-sectional area of said fuel duct means to modulate the mass flow rate of fuel to said mixing passage, said variable restriction means comprising support means and fuel metering means defining said flow cross-sectional area and respectively having first and second different linear coefficients of expansion such that differential expansion and contraction of said support and fuel metering means relative to one another in response to fuel temperature changes varies the flow-controlling cross-sectional area of said fuel duct means inversely relative to such temperature changes to thereby modulate temperature-dependent fuel density changes to reduce resultant mass fuel flow rate variations, said fuel metering means being disposed in flow controlling relation with said fuel duct means and having mounting means supported in fixed relation by and to said support means and a valve member, said mounting means being disposed at one end of said valve member and said fuel metering means comprising an extension of said valve member extending longitudinally of said valve member away from said one end of said valve member and terminating in a free end slidable in said support means, said valve member being unrestrained from said free end to one end thereof, said free end having a free edge movable in a fuel passageway of said fuel duct means to define therewith said flow controlling cross-sectional area such that the differential expansion and contraction of said valve member relative to said support means in response to fuel temperature changes causes movement of the free end of said valve member in a direction to effect the variation in flow controlling cross-sectional area of said fuel duct means, said movement of said valve member being in a direction transverse to the direction of fuel flow in said fuel passageway in the zone of said flow controlling cross-sectional area, said free end and free edge being configured relative to said valve member movement direction and to said fuel passageway to create turbulant flow of the fuel flowing past said flow-controlling cross-section zone whereby the effect of temperature-induced viscosity changes in said fuel is essentially nullified and essentially only temperature-induced changes in fuel density are compensated by said differential expansion and contraction variation of said flow-controlling cross-sectional area.

2. The carburetor as set forth in claim 1 wherein said valve member comprises a rod-like needle body with said mounting means comprising a cylindrical portion at said one end of said needle body and sized for securement in a first bore of said support means, said fuel metering means comprising a reduced diameter extension of said needle body extending axially away from said one end and having a cylindrical stem portion slidable in a second bore of said support means and terminating at said free end, the free end face of said stem portion defining said free edge, said second bore intersecting said fuel passageway in said zone with its axis oriented transverse to fuel flow direction in said zone.

3. The carburetor as set forth in claim 2 wherein said needle body mounting portion is externally threaded and said first bore of said support means is internally threaded, said needle body being axially insertable in said first bore and adjustably threadably secured therein to vary the position of said stem in said fuel passageway by rotation of said body relative to said first bore.

4. The carburetor as set forth in claim 3 wherein said needle body material and dimensions are selected relative to the dimensions of said fuel passageway such that said differential expansion and contractions of said needle body moves the free end of said stem through a range of movement corelated with the normal ambient range of temperatures in which said carburetor is operable so as to vary the cross-sectional flow controlling area in the order of about 1% per 10° C. ambient temperature change to thereby modulate fuel flow in said passageway inversely in accordance with said temperature-induced changes in the density of the fuel flowing therethrough.

5. The carburetor as set forth in claim 1 wherein said fuel duct means of said carburetor comprises main and idle fuel duct means constructed and arranged to separately conduct fuel from said chamber respectively to main and idle fuel nozzles in said mixing passage, said fuel metering system comprising a pair of said variable restriction means associated one with each of said main and idle duct means for varying the effective flow cross-sectional area of said main and idle fuel duct means to so modulate the flow rate of fuel therethrough respectively to said main and idle fuel nozzles in said mixing passage.

6. The carburetor as set forth in claim 2 wherein said one end of said body is fixed and encapsulated in said first bore by adhesive sealant means disposed thereover and in said first bore.

7. The carburetor as set forth in claim 1 wherein said support means is a metallic material and said restriction means is made from a plastic material.

8. The carburetor as set forth in claim 7 wherein said metallic material comprises aluminum or an aluminum alloy and said plastic material comprises Delrin or other plastic material resistant to hydrocarbon fuel adverse effects.

9. The carburetor as set forth in claim 2 wherein the longitudinal central axis of said needle body and the axis of said fuel passageway are oriented generally perpendicularly to one another.

10. The carburetor as set forth in claim 9 wherein said free end face of said stem portion is disposed generally flush with the central axis of said fuel passageway in said zone at a selected standard ambient adjustment temperature.

11. The carburetor as set forth in claim 10 wherein said fuel passageway comprises a cylindrical bore in said zone having a diameter less than that of said stem portion and said axes of said stem portion and said fuel passageway bore substantially intersect in said zone.

12. The carburetor as set forth in claim 1 wherein said valve member mounting means comprises a piston slidable in a bore and having a stem protruding therefrom defining said fluid metering means, and a body of material having a relatively high coefficient of expansion, such as silicone, disposed in said bore between said piston and said support means to generate the principal differential expansion and contraction of the restriction means relative to the support means.

13. The carburetor as set forth in claim 12 wherein said piston is spring biased for movement in the direction of contraction of said body of material of said restriction means.

14. The carburetor as set forth in claim 1 wherein said variable restriction means comprises a slide valve element having a transverse end face at a free end thereof to define said fluid metering means of said restriction means, said support means including a valve plate affixed thereto and juxtaposed in planar face-to-face relationship with said slide valve element, said valve plate having a flow control opening therethrough registering with said duct means, said slider valve element end face being disposed for movement in variable registry with said valve plate opening for varying the effective flow controlling cross-section of said valve plate opening.

15. The system as set forth in claim 14 wherein said valve plate opening has a square configuration in plan view with a first pair of opposed corners of said square being aligned in the direction of movement of said slide valve element end face and the second pair of opposed corners of said square opening being disposed in perpendicular alignment to such movement, said end face of said slider element having a V-shaped notch with a 90° apex aligned with said first pair of opposed corners of said square opening to thereby vary the cross-sectional area of said opening while maintaining a square configuration in said flow controlling cross-section.

16. The system as set forth in claim 14 wherein said opening in said valve plate is rectangular in configuration with the lengthwise dimension extending perpendicular to the direction of movement of said slide valve element end face, said end face being linear or straight so as to be disposed parallel to the lengthwise dimension of said valve plate opening.

* * * * *